W. R. HUSTON.
FOOD PRODUCT AND METHOD OF MAKING THE SAME.
APPLICATION FILED AUG. 30, 1921.
1,414,022.  Patented Apr. 25, 1922.
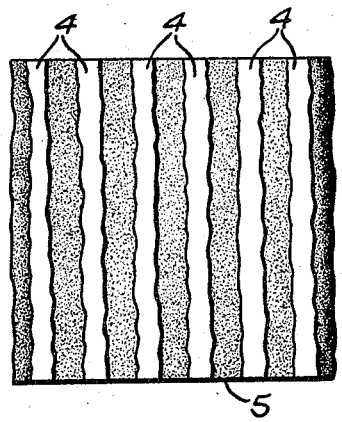
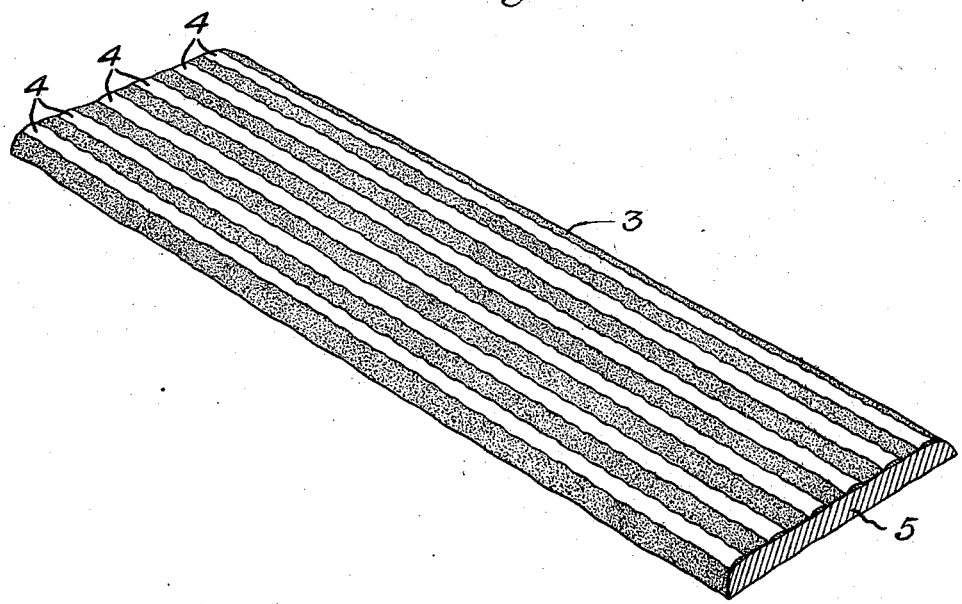
Inventor:
William Roy Huston,
by Emery, Booth, Janney & Varney
Attys.

UNITED STATES PATENT OFFICE.

WILLIAM ROY HUSTON, OF AUBURN, MAINE.

FOOD PRODUCT AND METHOD OF MAKING THE SAME.

1,414,022. Specification of Letters Patent. Patented Apr. 25, 1922.

Application filed August 30, 1921. Serial No. 496,896.

*To all whom it may concern:*

Be it known that I, WILLIAM ROY HUSTON, a citizen of the United States, and resident of Auburn, in the county of Androscoggin, State of Maine, have invented an Improvement in Food Products and Methods of Making the Same, of which the following description, in connection with the accompanying drawings, is a specification, like characters on the drawings representing like parts.

This invention pertains to improvements in food products and methods of making the same, and more particularly, though not exclusively, to improvements in cookies and their manufacture.

It is among the objects of the invention to improve the structure and general acceptability of the product.

In the drawings, which show one illustrative embodiment of a preferred form of cookie made in accordance with my invention:—

Figure 1 is a plan view of a cookie; and

Fig. 2 is a perspective view of a portion of the strip of baked material from which the cookies may be formed.

Referring to the drawings and to the preferred form of my invention selected for illustrative purposes, I have shown a cookie including a body portion 3 formed of any usual ingredients, preferably by being extruded through a suitable forming die presenting a cross-section of suitable form. The preferred form of my invention illustrated is provided with frosting or icing which, however, is not applied in the usual form as a continuous sheet covering one entire side of the cookie, but is applied in strips or ribbons 4, preferably by extruding the icing through suitable spaced apertures above the extruded dough for the body portion 3 and prior to baking thereof. The icing thus applied is baked with the dough and, as the dough is exposed between the strips of icing, it can brown on the iced side of the cookie and a purchaser can see the brown, which not only has an appetizing appeal, but shows that the cookie is well baked on the iced as well as on the other sides. Where the icing is applied in such a way as not to extend in a continuous sheet, any cracking tendency which may arise therein is localized whether arising from cutting, breaking, biting or otherwise, thereby minimizing not only the cracking of the icing but also the loss or general disruption thereof. The adherent and penetrating tendency of the icing is greater near the margins and, therefore, by providing many margins as in accordance with my invention, the adherence of the icing is increased with the average cookie material, especially where, as with many types of cookies, gases are given off during the baking which collect under the icing and form bubbles therein and in cookies where the dough is or becomes more or less roughened or porous during the baking operation. The application of the icing in segregated form, especially where applied in stripes, not only gives an opportunity for much of the gas to escape, but, where bubbles are formed in the icing, limits their extent in at least one direction and therefore greatly lessens the likelihood of extended rupture of the icing. During the baking the icing has a tendency to bite into the dough to form an extremely adherent stripe.

It will be clear that many of the advantages of my invention will be present in cookies wherein the icing is deposited in segregated form other than continuous strips, and that the icing deposit may for some purposes be in sinuous form or that the strips or ribbons of icing may be crossed or otherwise arranged.

The cookie illustrated is preferably, as shown, cut or sawed from the continuous strip after the baking operation, thus providing ends 5 more absorbent than the four sides thereof exterior during the baking operation, the absorbent properties being desirable where the cookie is dipped in coffee or other liquid prior to eating. The strip form of icing is particularly advantageous in cookies cut in this way, as disruption of the icing and consequent wastage is minimized.

The specific cookie illustrated, viz., one having stripes of icing extending in general parallelism thereacross, is of advantage even where the icing is applied during or after baking, the adherence thereof being somewhat increased and the tendency to crack under various conditions being to some extent localized, but I much prefer that the icing be applied prior to completion of the baking operation—preferably entirely prior to baking and preferably immediately after the extrusion of the strip of dough which forms the body of the cookie.

It will be understood that the word cookie is used in a sense to include any form of biscuit or the like, whether the body portion thereof is sweetened or unsweetened, and that icing is used broadly to define coatings of all kinds having the several characteristics of icing.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims:

1. A cookie having stripes of icing across one side thereof baked simultaneously with the body of the cookie.

2. A cookie having icing baked thereon with the body portion thereof, the icing being divided to produce a plurality of edges adherent to the cookie and to limit any tendency of the icing to flake or part from the body.

3. The method of making iced cookies which comprises forming the body part of dough, depositing a ribbon of icing on one side thereof, and baking the dough and icing together thereby to provide cookies with icing thereon which is adherent at its edges to the body part.

4. The method of making iced cookies which comprises extruding the dough to provide a continuous strip of appropriate cross-section, extruding icing in separated relatively narrow streams onto the top of said strip of dough, baking the strip with the icing thereon to provide a longitudinally striped strip or bar of baked material, and transversely severing said strip or bar subsequent to the baking operation.

In testimony whereof, I have signed my name to this specification.

WILLIAM ROY HUSTON.